(12) United States Patent
Cho et al.

(10) Patent No.: US 7,496,389 B2
(45) Date of Patent: Feb. 24, 2009

(54) SLIDING SWING MECHANISM FOR PORTABLE APPARATUS

(75) Inventors: Woo-Chul Cho, Suwon-si (KR); Jin-Hee Cho, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 590 days.

(21) Appl. No.: 11/125,961

(22) Filed: May 10, 2005

(65) Prior Publication Data

US 2006/0025184 A1 Feb. 2, 2006

(30) Foreign Application Priority Data

Jul. 30, 2004 (KR) ........................ 10-2004-0060306

(51) Int. Cl.
*H04M 1/00* (2006.01)
*A47B 91/00* (2006.01)
(52) U.S. Cl. ............... 455/575.4; 455/575.1; 455/575.3
(58) Field of Classification Search ............... 455/575.4, 455/575.3, 575.1, 556.1, 90.3, 550.1; 379/455, 379/428.01, 426.1, 433.09, 433.11, 433.12, 379/433.13; 248/349.1, 292.13
See application file for complete search history.

(56) References Cited

U.S. PATENT DOCUMENTS 7,159,833 B2 * 1/2007 Kato ....................... 248/349.1

* cited by examiner

*Primary Examiner*—Melur Ramakrishnaiah
(74) *Attorney, Agent, or Firm*—The Farrell Law Firm, PC

(57) ABSTRACT

A sliding swing apparatus of a portable apparatus having a body and a sliding housing adapted to be exposed/covered through sliding and swing motions while facing the body including a guide means mounted on a base, a swing shaft adapted to slide while being contained in the guide means, a sliding plate adapted to slide along the longitudinal direction of the base by means of the guide means, a force supply means positioned between the sliding plate and the guide means and adapted to provide a stopping force in the initial and final positions and an opening or closing force between the initial and final positions; and a swing plate connected to the swing shaft, the rotational motion of the swing plate being limited by the guide means during the sliding movement, and the swing plate being adapted to swing only after the sliding movement is completely performed.

22 Claims, 14 Drawing Sheets

SLIDING SWING MECHANISM FOR PORTABLE APPARATUS

PRIORITY

This application claims priority to an application entitled "Sliding Swing Apparatus for Portable Apparatus" filed with the Korean Intellectual Property Office on Jul. 30, 2004 and assigned Serial No. 2004-60306, the contents of which are hereby incorporated by reference.

BACKGROUND OF THE INVENTION

1. Field of the Invention

The present invention relates to digital portable apparatuses including cellular phones, PDAs (personal digital assistants), HHPs (hand held phones), MP3 phones, game phones, camera phones, Internet phones, and communication apparatuses combining them, and more particularly to a sliding swing apparatus for a portable apparatus adapted to perform a sliding motion in combination with a swing motion so that displayed information can be viewed conveniently.

2. Description of the Related Art

In general, a "portable communication apparatus" refers to an electronic apparatus, which a user can carry with him to perform wireless communication with a desired partner. In consideration of portability, designs of such portable communication apparatuses tend to not only be compact, slim, and light, but also have greater multimedia availability, with a wider variety of functions. In particular, future portable communication apparatuses are expected to incorporate greater multi-functionality and multi-purpose utilization, as well as becoming even more compact and light, but also will be modified to be suitable for various multimedia environments or Internet environments. Additionally, such portable communication apparatuses are now commonly used by all kinds of people throughout the world and are recognized by some people as a nearly indispensable part of life.

Conventional portable communication apparatuses may be classified into various types according to their appearance, such as bar-type portable communication apparatuses, flip-type portable communication apparatuses, and folder-type portable communication apparatuses. In addition, portable communication apparatuses may be classified into neck wearable type communication apparatuses and wrist wearable type communication apparatuses according to the position at or the way in which a user puts on the communication apparatuses. Furthermore, portable communication apparatuses may be classified into swing-type communication apparatuses and sliding-type communication apparatuses according to ways of opening and closing the communication apparatuses. These variously classified portable communication apparatuses can be easily understood by those skilled in the art.

Meanwhile, conventional portable communication apparatuses now tend to have a function of transmitting data at a high speed in addition to the basic function of performing voice communication. In other words, according to the increase of demand by consumers, portable communication apparatuses now tend to provide a service using a wireless communication technology capable of transmitting data at a high speed.

According to current trends, conventional portable communication apparatuses are equipped with a camera lens to transmit video signals. Portable communication apparatuses generally have an external or embedded camera lens module to perform video communication with a desired partner or to take pictures of a desired object.

However, conventional sliding-type portable communication apparatuses, such as those disclosed in Korean Patent Application No. 2002-71911 commonly assigned with this application (the contents of which are hereby incorporated by reference), is adapted to slide only in one direction from the body and only one display device is fixedly mounted on the housing.

As such, conventional portable communication apparatuses are inconvenient for watching videos or TVs through the display device. This is because the display device must have a larger display screen in order to display information in a TV or video-watching mode. Accordingly, there is a need for a portable apparatus capable of performing a sliding motion in combination with a swing motion and a sliding swing apparatus for the same.

SUMMARY OF THE INVENTION

Accordingly, the present invention has been made to solve the above-mentioned problems occurring in the prior art, and an object of the present invention is to provide a sliding swing apparatus having a sliding function in combination with a swing function for use in a sliding swing type portable apparatus.

Another object of the present invention is to provide a sliding swing apparatus adapted to implement a swing movement after a complete sliding movement.

Still another object of the present invention is to provide a sliding swing apparatus maximizing slimness.

Yet another object of the present invention is to provide a sliding swing apparatus adapted to make smooth sliding and swing movements in a TV or video-watching mode so that the displayed screen can be watched conveniently.

In order to accomplish this object, there is provided a sliding swing apparatus of a portable apparatus having a body and a sliding housing adapted to be exposed/covered through sliding and swing motions while facing the body, the sliding swing apparatus including a base constrained by the body, a first guide means mounted on the base, a second guide means positioned adjacently to the first guide means, a swing shaft adapted to slide by means of the second guide means, a sliding plate adapted to slide along the longitudinal direction of the base while continuously facing the base by means of the first guide means, a force supply means positioned between the sliding plate and the second guide means and adapted to provide a stopping force in the initial position, a closing force between the initial position and within a first sliding distance, an opening force between out of the first sliding distance and the final position, and a stopping force in the final position, and a swing plate connected to the swing shaft, while being constrained by the sliding housing, and positioned in such a manner that it faces the sliding plate to provide tension between each other, the swing plate being adapted to be rotated only when a compulsive force larger than the tension is applied while facing the sliding plate at a first rotation angle.

In accordance with another aspect of the present invention, there is provided a sliding swing apparatus of a portable apparatus having a body and a sliding housing adapted to be exposed/covered through sliding and swing motions while facing the body, the sliding swing apparatus including a guide means mounted on a base, a swing shaft adapted to slide while being contained in the guide means, a sliding plate adapted to slide along the longitudinal direction of the base by means of the guide means, a force supply means positioned between the sliding plate and the guide means and adapted to provide a stopping force in the initial and final positions and an opening or closing force between the initial and final positions, and a swing plate connected to the swing shaft, the rotational motion of the swing plate being limited by the guide means during the sliding movement, and the swing plate being adapted to swing only after the sliding movement is completely performed.

In accordance with still another aspect of the present invention, there is provided a sliding swing apparatus of a portable apparatus having a body and a sliding housing adapted to be exposed/covered through sliding and swing motions while facing the body, the sliding swing apparatus including a sliding plate adapted to slide along a guide constrained by a base, a force supply means positioned between the sliding plate and the guide and adapted to provide a stopping force in first and second positions and an opening or closing force between the first and second positions; and a swing plate adapted to accompany the sliding plate as one unit during linear sliding together with the sliding plate by means of the guide, the rotational motion of the swing plate being limited during the sliding, and the swing plate being adapted to swing only after the sliding movement ends.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the following description of the present invention, a detailed description of known functions and configurations incorporated herein will be omitted when it may make the subject matter of the present invention unclear.

Figure 1:
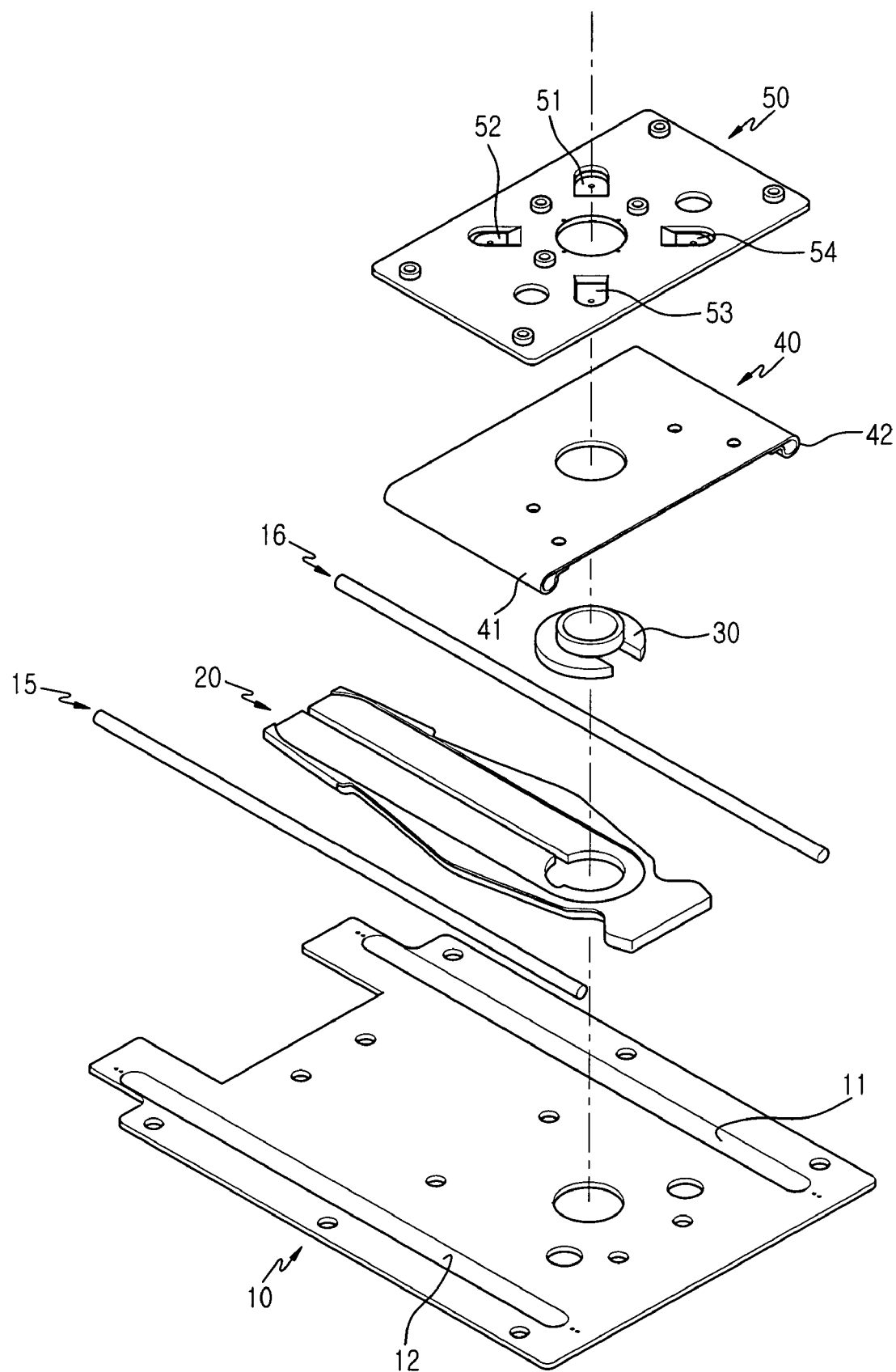
FIG. 1 is an exploded perspective view showing a sliding swing apparatus according to a preferred embodiment of the present invention.
Figure 2:
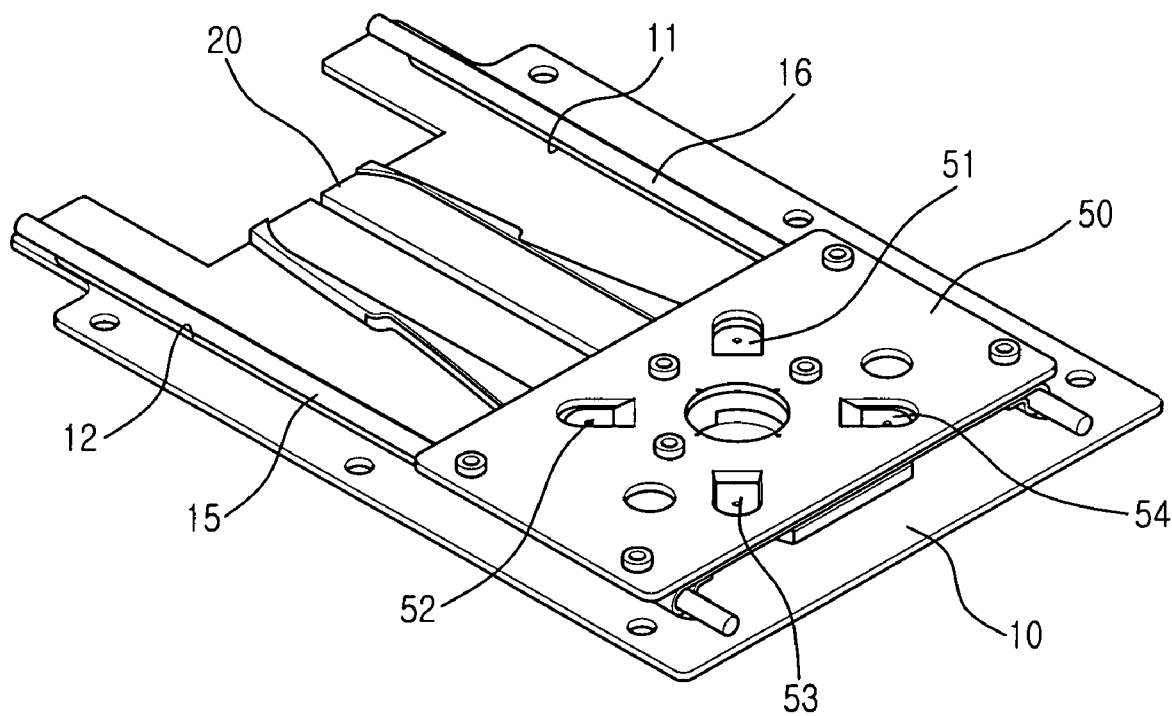
FIG. 2 is an assembled perspective view showing a sliding swing apparatus according to a preferred embodiment of the present invention.

As shown in FIGS. 1 and 2, a sliding swing apparatus for use in a sliding swing type portable apparatus according to the present invention includes a base 10, first guide means (explained below) positioned on both sides of the base 10, a second guide means 20 positioned adjacent to the first guide means, a swing shaft 30 adapted to slide by means of the second guide means 20, a sliding plate 40 constrained by the first guide means and adapted to slide while continuously facing the base 10, a force supply means (not shown) positioned between the sliding plate 40 and the second guide means 20 to provide the sliding plate 40 with a sliding force; and a swing plate 50 adapted to swing while facing the sliding plate 40. The force supply means, which includes an elastic body and a rolling member (not shown in the drawings), will be described later in detail.

As shown in FIGS. 1 and 2, the swing plate 50 has a number of tension protrusions 51 to 54 to maintain tension between the sliding plate 40 and the swing plate 50. The swing plate 50 remains stationary on the sliding plate 40 and, if an external constant force larger than the tension is applied, swings while facing the latter at a first rotation angle. The tension protrusions 51 to 54 are made by pressing and bending predetermined parts of the swing plate.

The sliding plate 40 is adapted to slide along a pair of guide rods 15 and 16. The swing plate 50 proceeds to swing after completing a sliding movement on the sliding plate 40.

As shown in FIG. 1, the first guide means includes a pair of guide grooves 11 and 12 recessed from the base 10 the length of the sliding distance of the sliding plate 40 between its initial and final positions, a pair of guide rods 15 and 16 having both ends fixed by laser welding in such a manner that they traverse the pair of guide grooves 11 and 12, and a pair of fastening portions 41 and 42 made by bending both ends of the sliding plate 40 in such a manner they surround a predetermined length of the pair of guide rods 15 and 16 and adapted to slide along the pair of guide rods 15 and 16. The base 10 has fine holes formed adjacently to the pair of guide grooves 11 and 12 so that both ends of the pair of guide rods 15 and 16 can be welded thereto. The pair of guide grooves 11 and 12 extend linearly and provide the pair of fastening portions 41 and 42 with a space to move therein.

Figure 3:
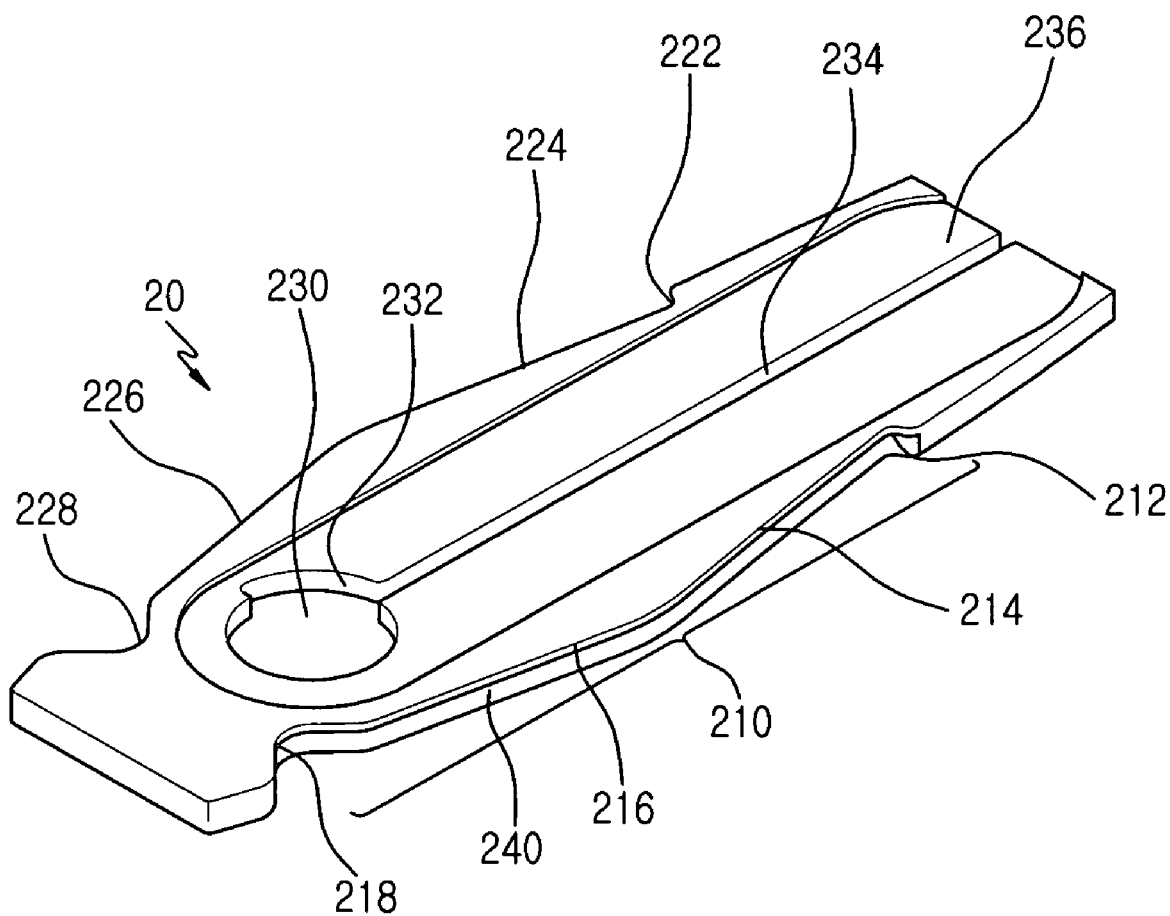
FIG. 3 is a perspective view showing a guide rail of a siding swing apparatus according to a preferred embodiment of the present invention.
Figure 4:
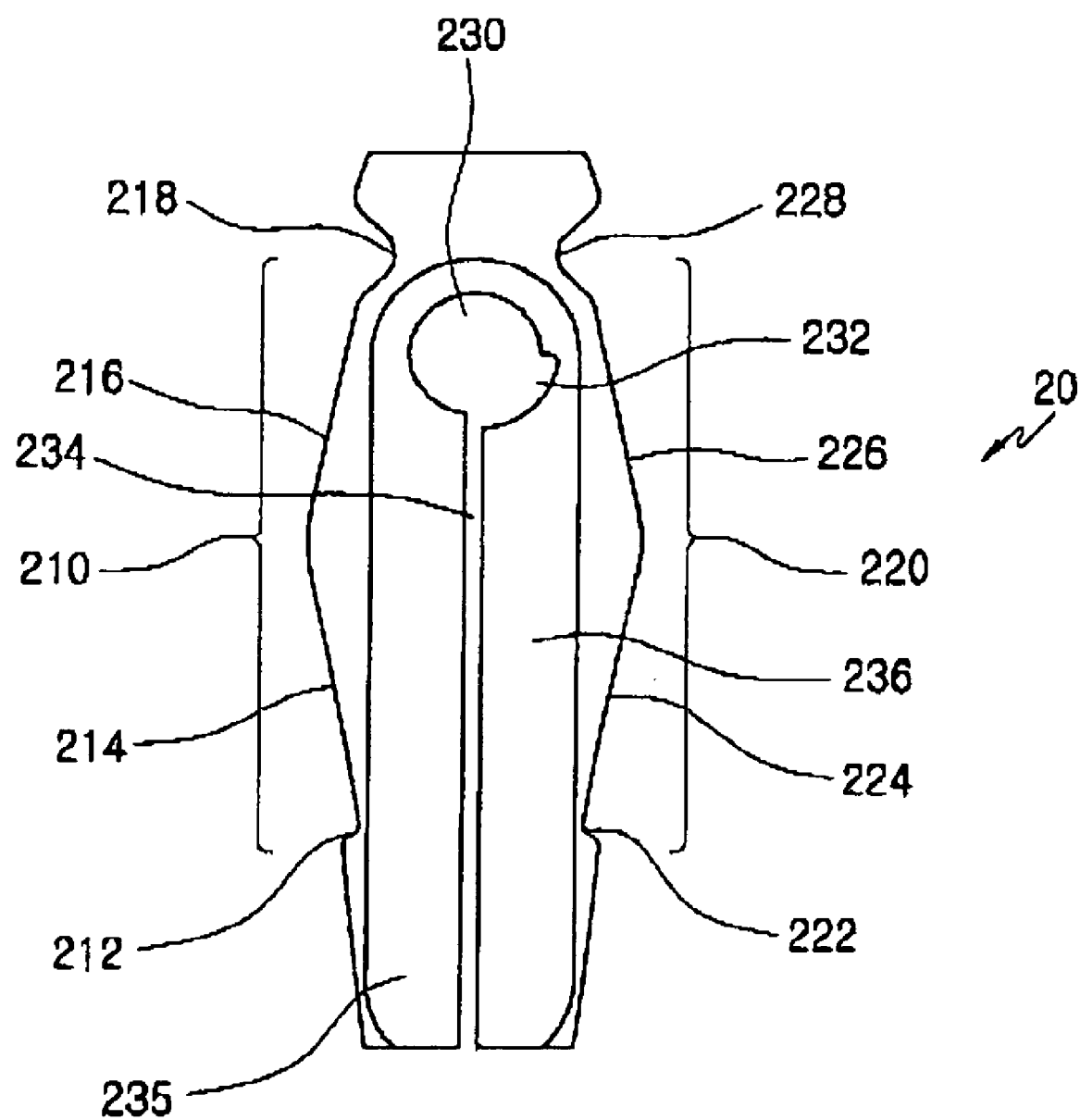
FIG. 4 is a front view of the guide rail shown in FIG. 3.
Figure 5:
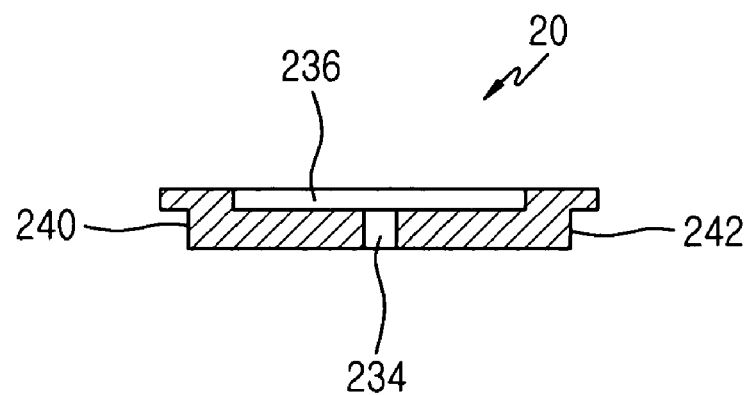
FIG. 5 is a sectional view taken along line X-X of FIG. 3.

The second guide means 20 according to the present invention will now be described with reference to FIGS. 3 to 5. As shown in FIGS. 3 to 5, the second guide means 20 includes guide rails of light aluminum alloy material. Specifically, the guide means 20 includes a pair of first guide rails 210 and 220 formed on both lateral surfaces thereof, respectively, and a pair of second guide rails 230 and 234 formed on the upper surface thereof and positioned between the pair of first guide rails 210 and 220.

The first guide rails 210 and 220 have first stop grooves 212 and 222 for determining the initial position of the sliding plate 40, second stop grooves 218 and 228 for determining the final position of the sliding plate 40, first slant surfaces 214 and 224 gradually extending away from the first stop grooves 212 and 222 perpendicularly to the sliding direction, and second slant surfaces 216 and 226 gradually approaching the second stop grooves 218 and 228 from the first slant surfaces 214 and 224 perpendicularly to the sliding direction. Preferably, curved portions are formed between the first stop grooves 212 and 222 and the first slant surfaces 214 and 224, between the first slant surfaces 214 and 224 and the second slant surfaces 216 and 226, and between the second slant surfaces 216 and 226 and the second stop grooves 218 and 228, respectively, so that the sliding plate 40 can slide smoothly thereon.

In addition, rolling grooves 240 and 242 of a predetermined depth are continuously positioned between the first stop grooves 212 and 222 and the second stop grooves 218 and 228 in order to support the rolling guide movement of a rolling member which will be described later.

The second guide rails 230 and 234 include a first guide groove 236 recessed a predetermined depth from the upper surface thereof so that the swing shaft can slide therein and a second guide groove 235 recessed a predetermined depth from the first guide groove 236 to limit the swing motion of the swing plate during sliding. Both ends of the first guide groove 236 are of a semi-cylindrical shape, which corresponds to that of the swing shaft. The second guide groove 235 linearly extends for the length of the sliding distance.

The second guide rail 234 preferably has a circular opening 230 through which a flexible circuit (not shown) passes and a swing opening 232 formed along the outer periphery of the opening 230. The principle of operation of the swing opening 232 will be described later.

Figure 6:
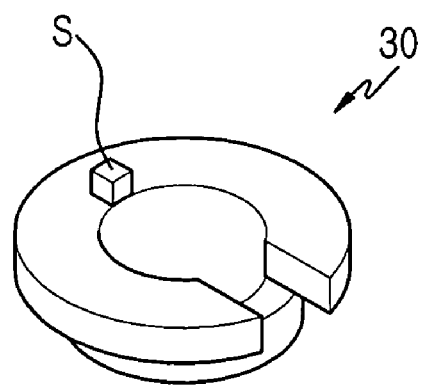
FIG. 6 is a perspective view showing a swing shaft of a sliding swing apparatus according to a preferred embodiment of the present invention.

The construction of the swing shaft 30 according to the present invention will now be described with reference to FIG. 6. The upper end of the swing shaft 30 is integrated to the swing plate by laser welding. The swing shaft 30 has a stopper S formed on the lower end thereof and an opening formed in the opposite direction to the stopper S. As will be described later, the stopper S limits the amount of rotation of the swing plate 30 and prevents the swing movement during the sliding movement. A flexible circuit (not shown) passes through the opening. The lower end of the swing shaft 30 is guided to slide on the second guide groove 236.

A rotation limitation means of the swing shaft 30 according to the present invention will now be described with reference to FIGS. 3 and 6. When the swing shaft 30 and the swing plate 50 are assembled to each other, the stopper S of the swing plate slides along the second guide rail 234 as the sliding plate 40 slides.

Figure 9:
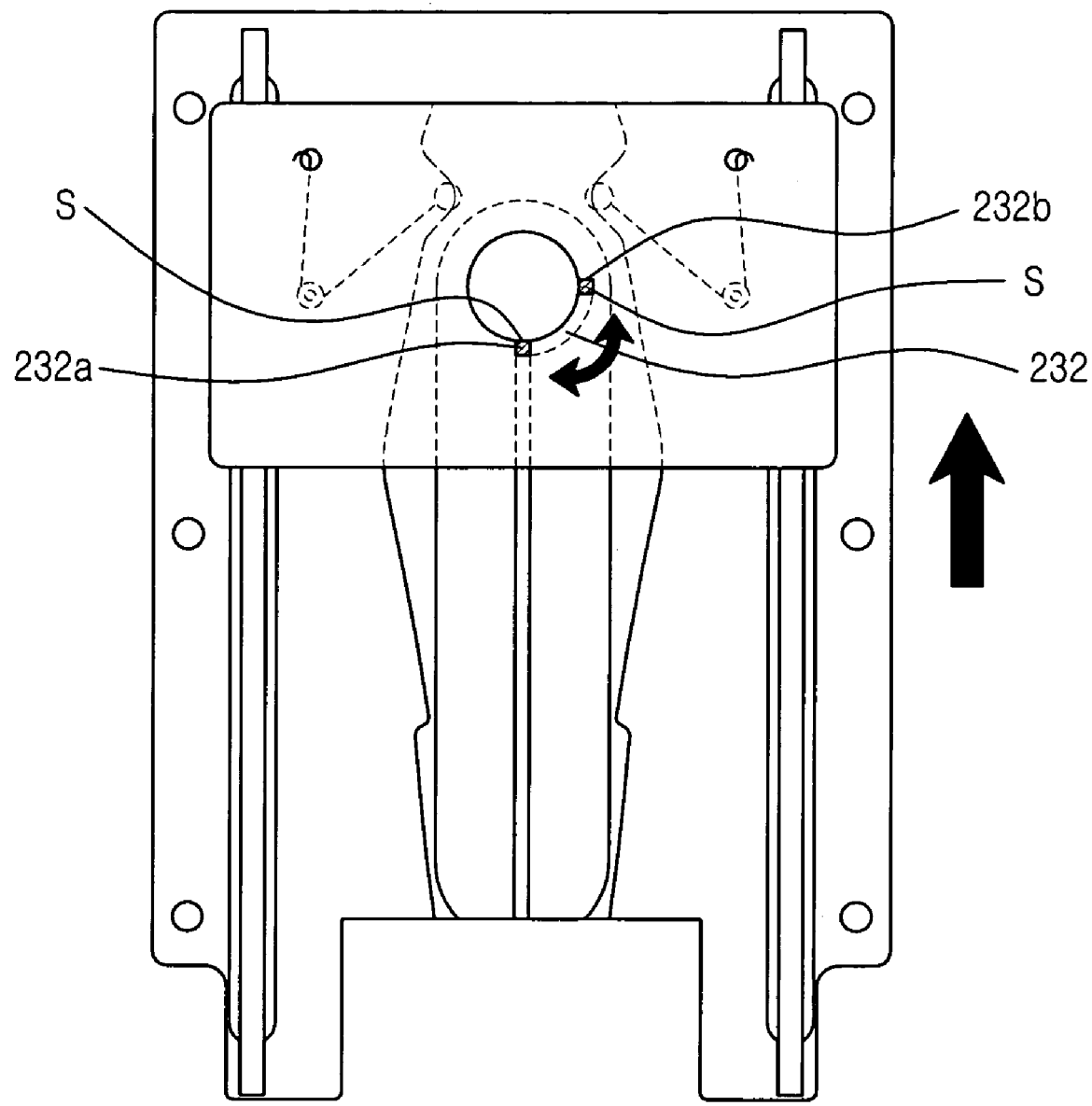
FIG. 9 is a front view showing a guide rail before and after a swing of a swing shaft according to a preferred embodiment of the present invention.

When the sliding movement of the sliding plate 40 ends as shown in FIG. 9, the stopper S is positioned on an end 232a of the swing opening 232. As the swing plate is rotated, the stopper S is rotated to the other end 232b of the swing opening 232. As such, the rotational movement of the stopper S is guided by the swing opening 232, and this limits the rotation of the swing plate. It is to be noted that, although the length of the swing opening 232 along the outer peripheral direction is shown to correspond to a rotational angle of 90° in the drawing, the length may correspond to a different rotational angle.

Figure 7:
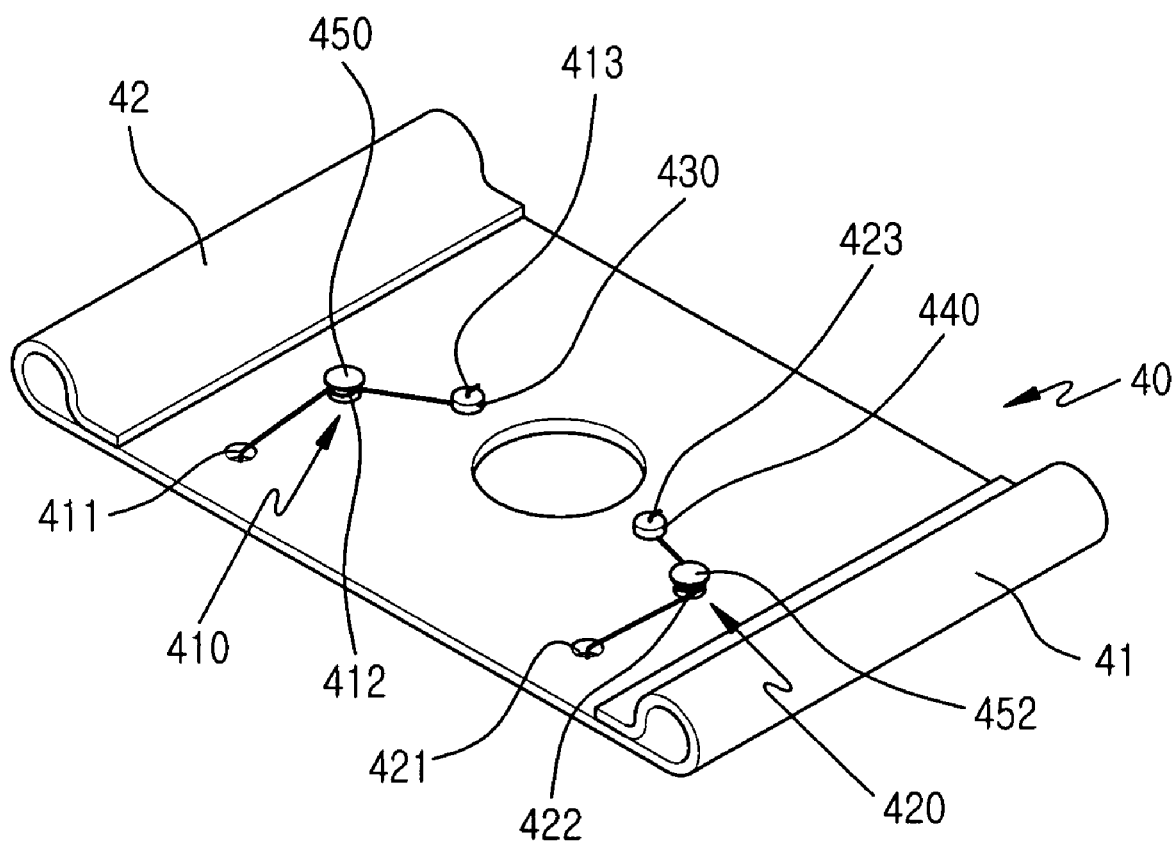
FIG. 7 is a perspective view showing a sliding swing apparatus having a sliding plate, which is equipped with a roller using a tension spring according to a preferred embodiment of the present invention.
Figure 8A:
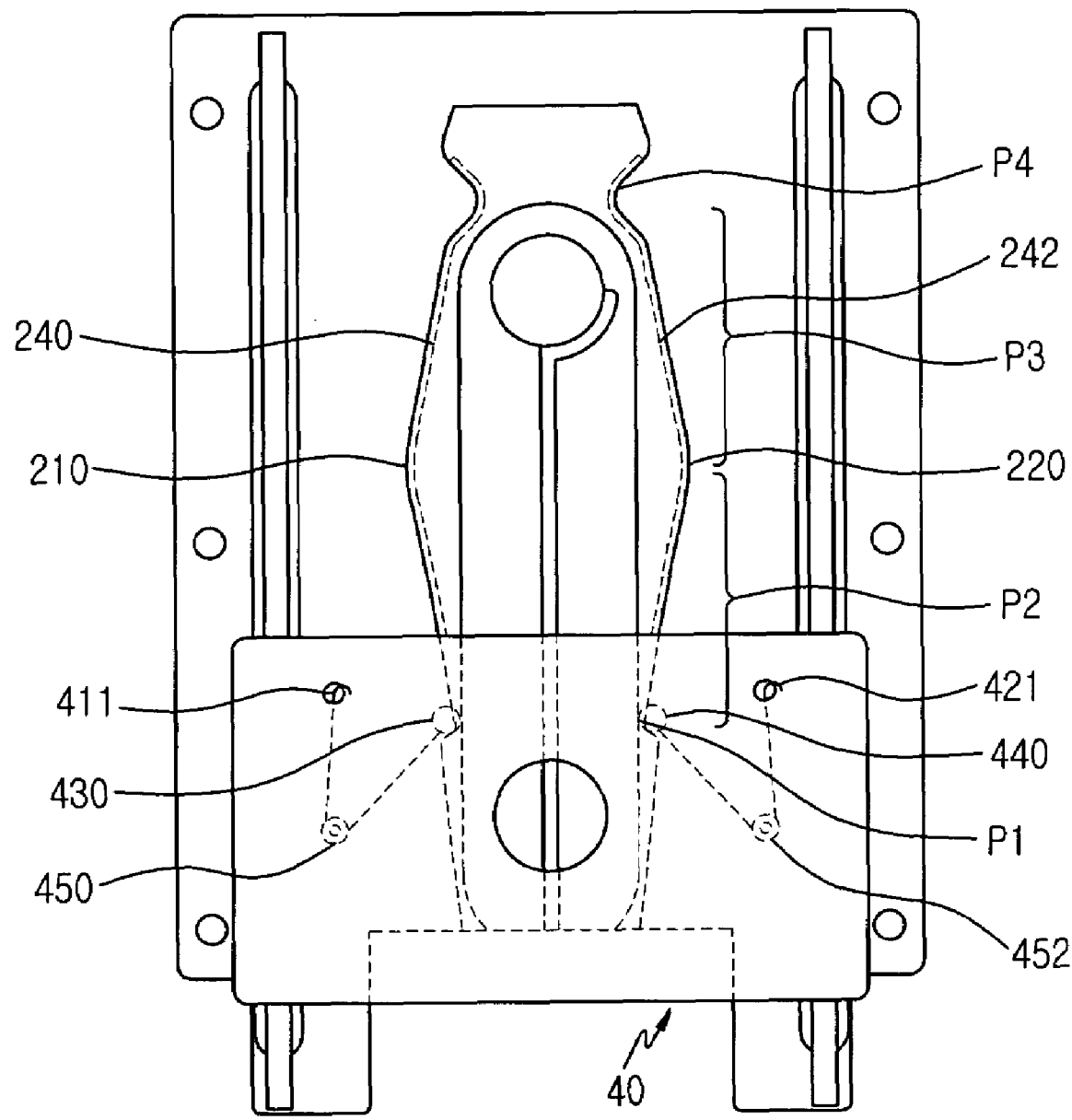
FIG. 8A is a front view showing a tension spring before a movement of a sliding plate according to a preferred embodiment of the present invention.
Figure 8B:
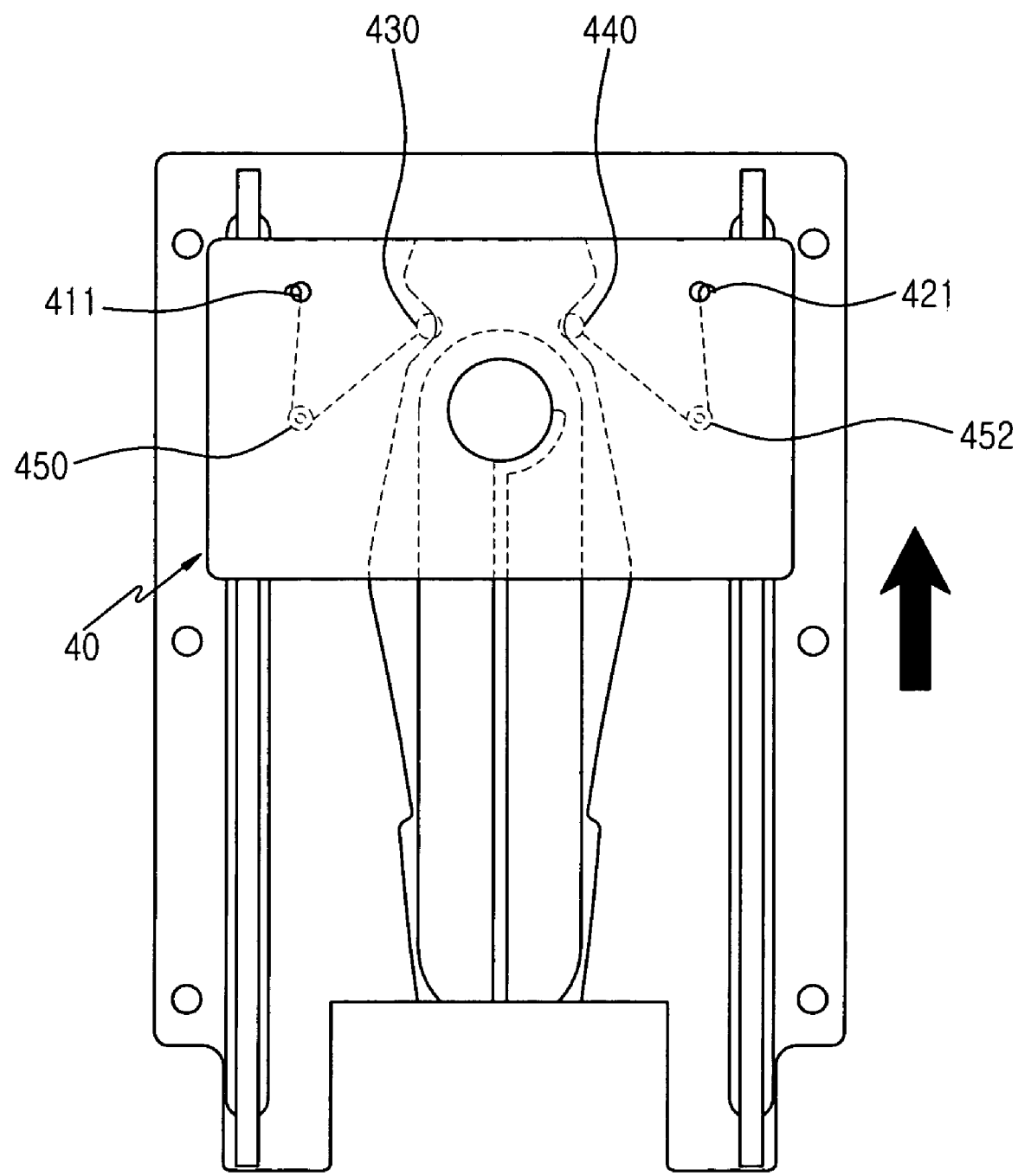
FIG. 8B is a front view showing a tension spring after a movement of a sliding plate according to a preferred embodiment of the present invention.

A semi-automatic sliding force supply means according to the present invention will now be described with reference to FIGS. 7 to 8B. As shown in FIGS. 7 to 8B, the force supply means provides a stopping force in the initial position P1, a closing force within the region of P2, an opening force within the region of P3, and a stopping force in the final position P4.

Specifically, the force supply means includes a pair of elastic bodies 410 and 420 and a pair of rolling members 430 and 440 adapted to roll while sliding and continuously being forced against the first guide rails 210 and 220 by a force from the pair of elastic bodies 410 and 420. The pair of elastic bodies 410 and 420 are made of torsion springs. The torsion springs 410 and 420 have fixed ends 411 and 421 constrained by the sliding plate, free ends 413 and 423 adapted to be guided along the lateral surface of the first guide rails 210 and 220, and center portions 412 and 422 positioned between the fixed ends 411 and 421 and the free ends 413 and 423 and fixed at the sliding plate 40 to provide a predetermined trajectory according to the sliding movement. The rolling members 430 and 440 are provided on the free ends 413 and 423 and are adapted to roll on the rolling grooves 240 and 242 (shown in FIG. 5) formed on the lateral surface of the first guide rails 210 and 220. The rolling members 430 and 440 are made of light metallic material.

Figure 10A:
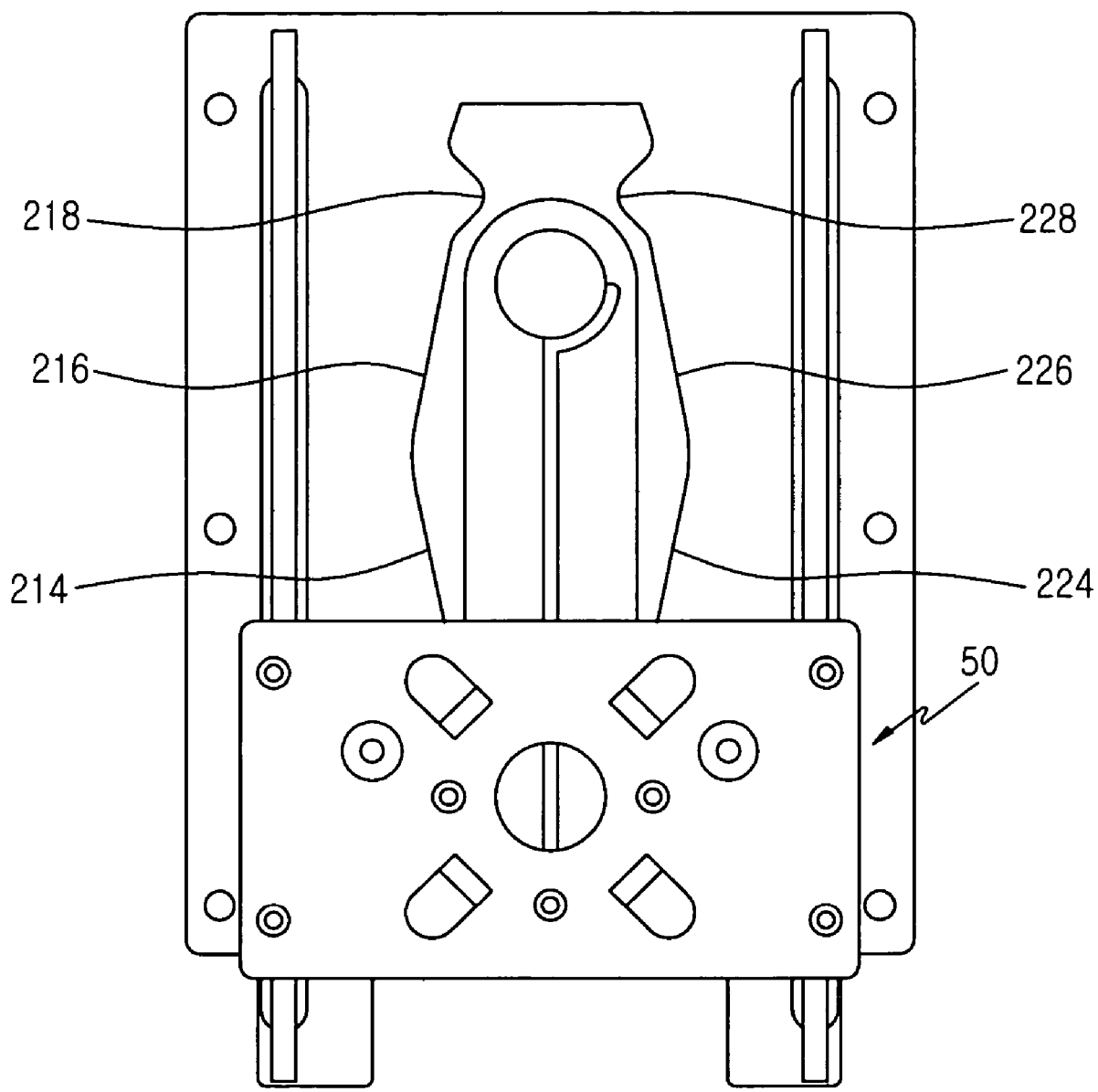
FIG. 10A is a front view showing a sliding swing apparatus before a movement of a sliding plate according to a preferred embodiment of the present invention.
Figure 10B:
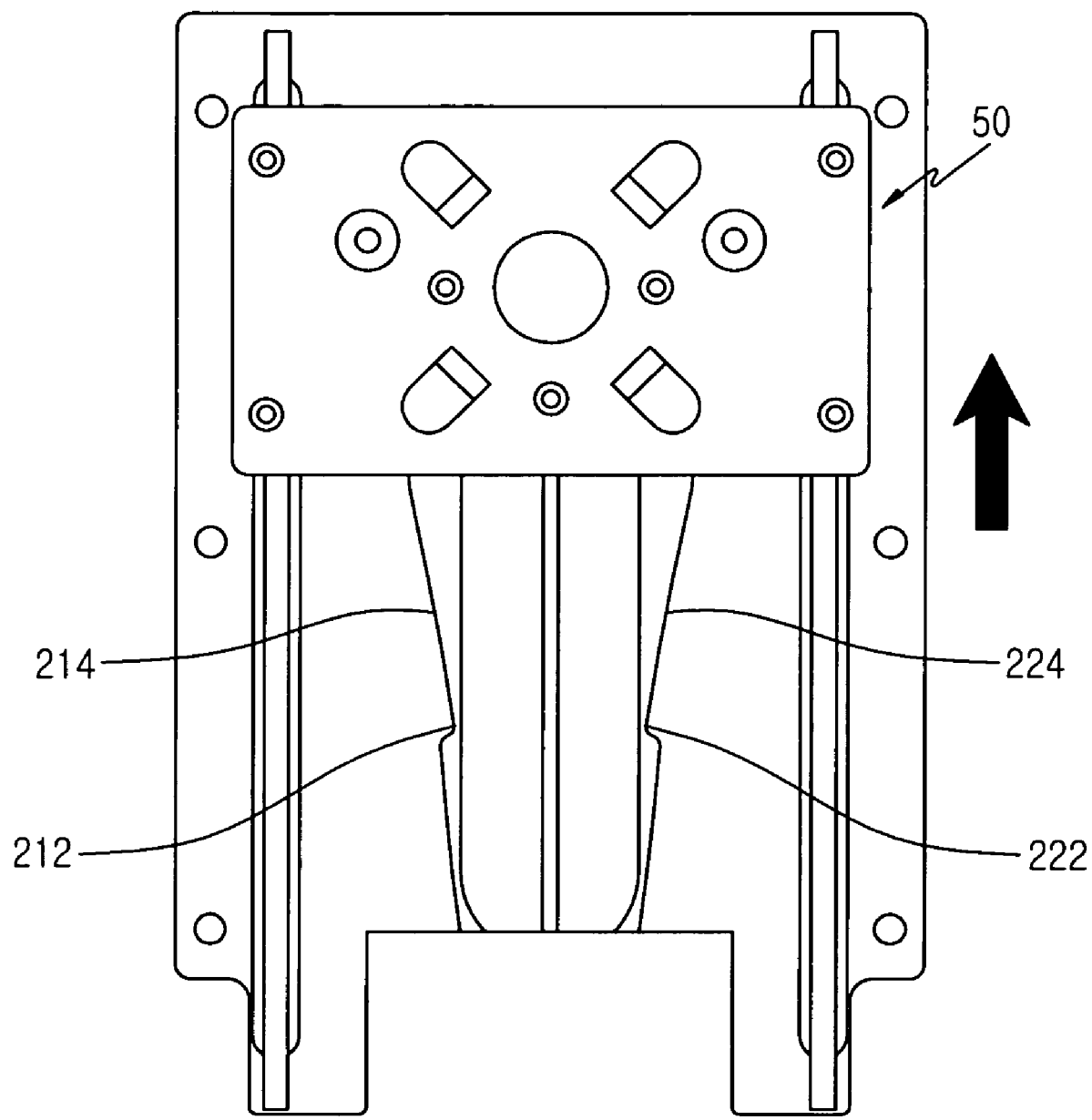
FIG. 10B is a front view showing a sliding swing apparatus after a movement of a sliding plate according to a preferred embodiment of the present invention.
Figure 11:
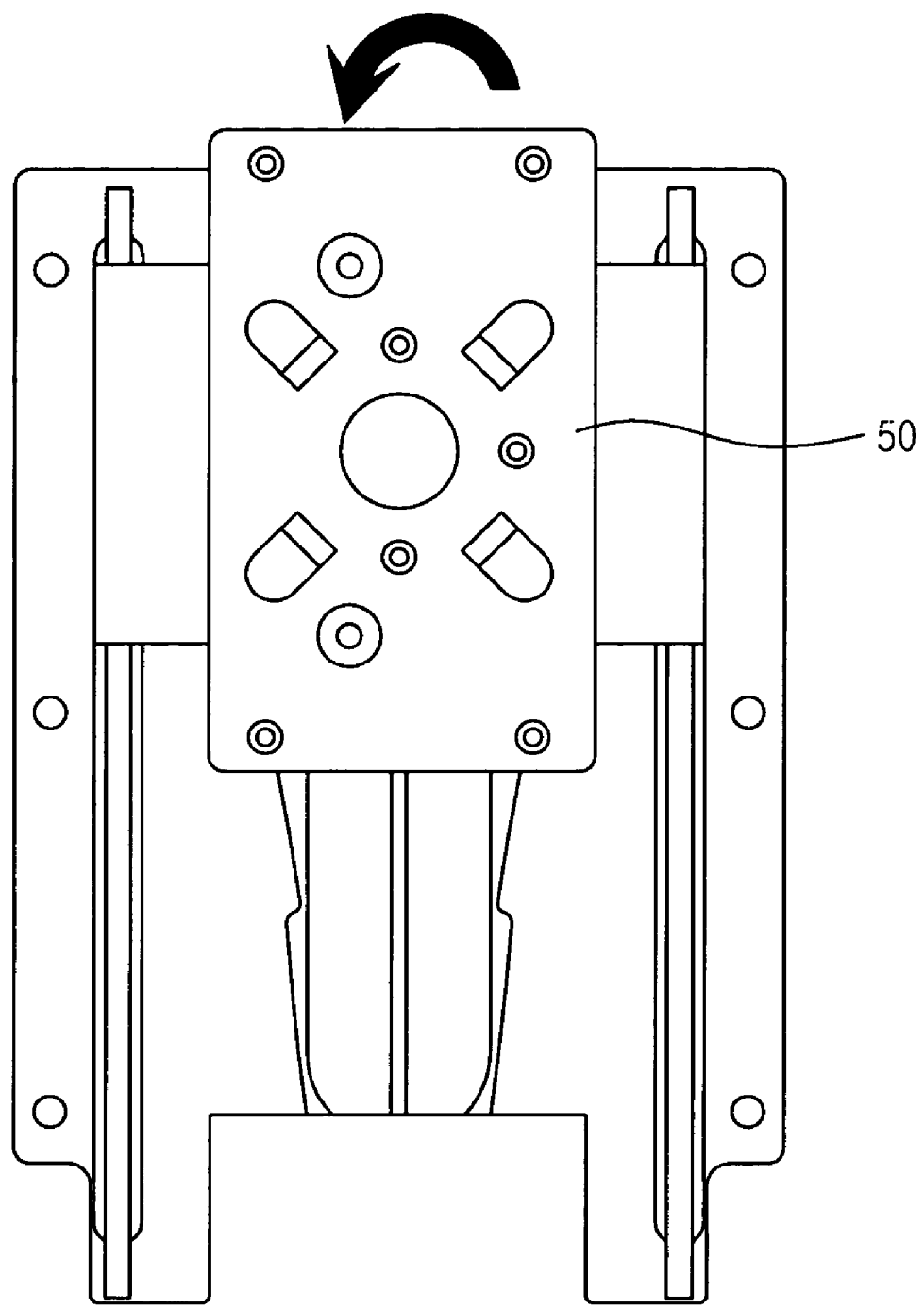
FIG. 11 is a front view showing a sliding swing apparatus after a swing of a swing plate after a movement of a sliding plate according to a preferred embodiment of the present invention.

FIG. 10A shows a state before a sliding of the sliding plate (hidden by the swing plate 50). The rolling members are positioned in the first stop grooves 212 and 222 in FIG. 10A. FIG. 10B is a front view showing a state after a complete sliding of the sliding plate (hidden by the swing plate 50). The rolling members have passed through the first and second slant surfaces 214, 224, 216, and 226 are positioned in the second stop grooves 218 and 228 and the stopper (shown in FIG. 9) is positioned on an end of the swing opening in FIG. 10B. FIG. 11 is a front view showing a state after a complete swing of the swing plate. The stopper (shown in FIG. 9) has traveled along the swing opening and is positioned on the other end of the swing opening in FIG. 11.

Figure 12:
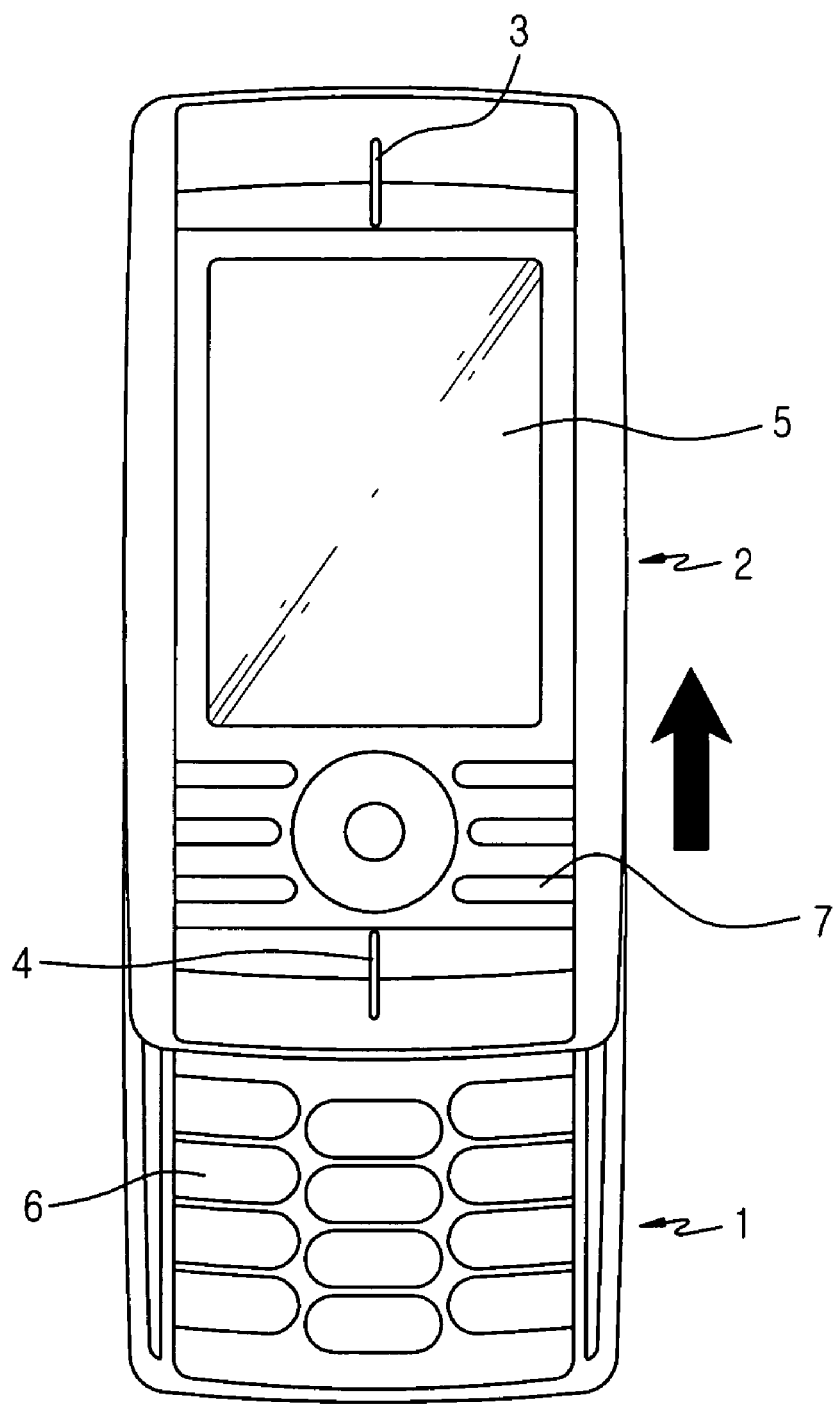
FIG. 12 is a front view showing a portable apparatus equipped with a sliding swing apparatus after a sliding of a sliding swing housing according to a preferred embodiment of the present invention.
Figure 13:
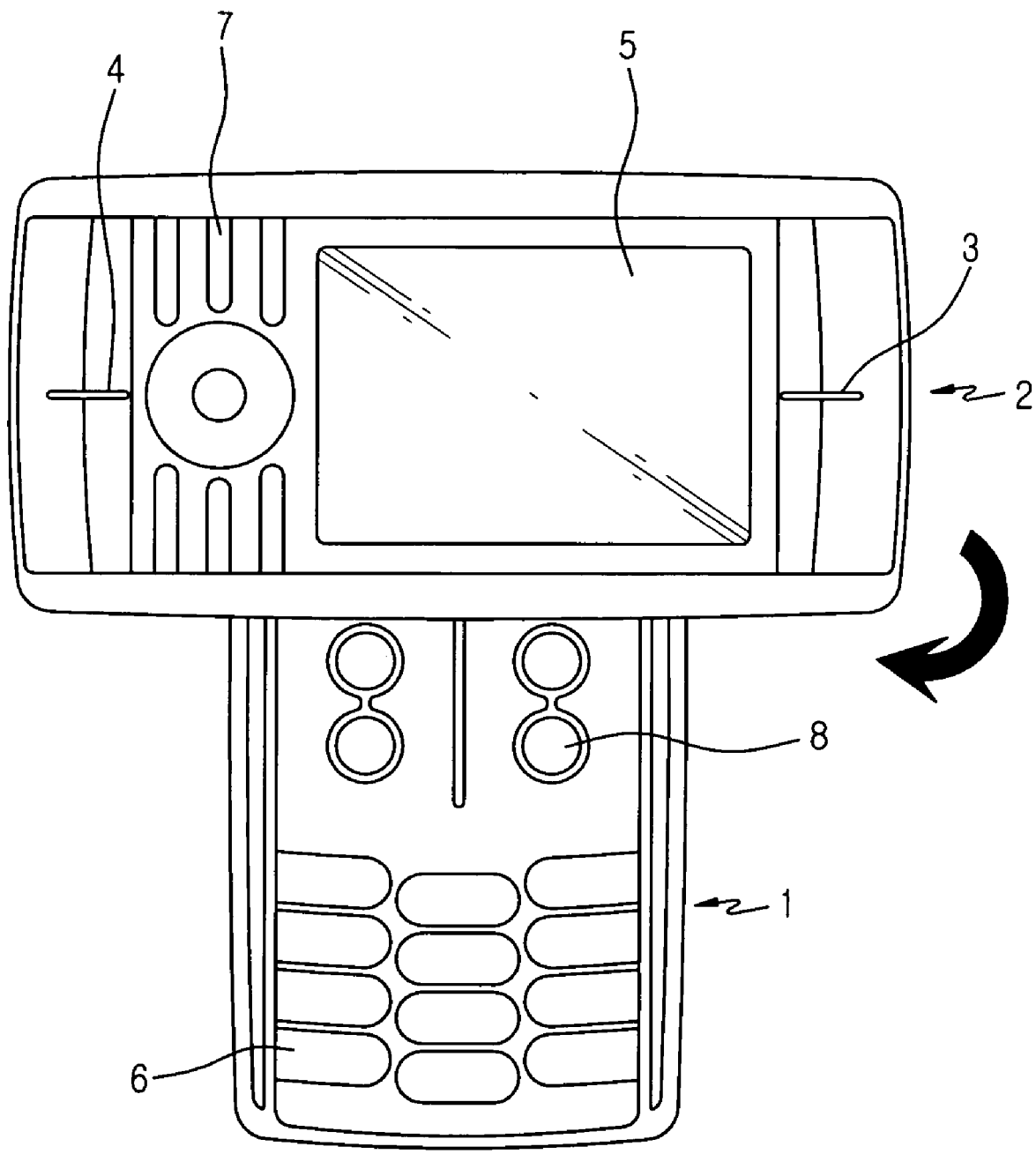
FIG. 13 is a front view showing a portable apparatus equipped with a sliding swing apparatus after a swing of a sliding swing housing according to a preferred embodiment of the present invention.

The operation of the portable apparatus equipped with the sliding swing apparatus according to the present invention will now be described. As shown in FIGS. 12 and 13, the portable apparatus includes a body 1 and a sliding swing housing 2 adapted to travel on the body 1. The body 1 has a first keypad 6 adapted to be exposed/covered according to whether the sliding swing housing 2 has slid or not and a second keypad 8 adapted to be exposed/covered according to whether the sliding swing housing 2 has swung or not.

FIG. 12 shows a state after the sliding swing housing 2 has slid in a linear direction. The sliding swing housing 2 has linearly slid on the body 1 while continuously facing the latter. FIG. 13 shows a state after the sliding swing housing 2 has swung about 90°. The sliding swing housing 2 has swung on the body 1 while continuously facing the latter. The sliding swing housing 2 has a first speaker 3 device positioned on the upper surface thereof, a display device 5 positioned adjacently to the first speaker device 3, a third keypad 7 positioned adjacently to the display device 5, and a second speaker device 4 positioned adjacently to the third keypad 7. The first and second speaker devices 3 and 4 provide a stereoscopic sound.

It is convenient to watch a displayed screen, such as a TV or a video, in a state as shown in FIG. 13. This is because the display device 5, which displays a screen, and the first and second speaker devices 3 and 4 are positioned in such a manner that the displayed screen can be watched in a wide-screen mode and listened to in stereo.

As mentioned above, the sliding swing apparatus according to the present invention makes it possible to watch the displayed screen in a stable and convenient manner in a TV or video-watching mode. In addition, it is possible to avoid the erroneous operation of the sliding swing housing and make the apparatus in a slim size by realizing a swing motion after a sliding movement.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A sliding swing apparatus of a portable communication apparatus having a body and a sliding housing adapted to be exposed/covered through sliding and swing motions while facing the body, the sliding swing apparatus comprising:
   a base constrained by the body;
   a first guide means mounted on the base;
   a second guide means positioned adjacent to the first guide means;
   a swing shaft adapted to slide by means of the second guide means;
   a sliding plate adapted to slide along the longitudinal direction of the base while continuously facing the base by means of the first guide means;
   a force supply means positioned between the sliding plate and the second guide means and adapted to provide a stopping force in an initial position, a closing force within a first sliding distance, an opening force between the first sliding distance and a final position, and a stopping force in the final position; and
   a swing plate connected to the swing shaft, while being constrained by the sliding housing, and positioned so as to face the sliding plate and to provide tension between each other, the swing plate being adapted to rotate only when a constant force is applied which is larger than the tension applied while facing the sliding plate at a first rotation angle.

2. The sliding swing apparatus as claimed in claim 1, wherein the force supply means comprises an elastic body and a rolling member adapted to roll while sliding and being continuously forced against the second guide means by a force from the elastic body.

3. The sliding swing apparatus as claimed in claim 2, wherein the elastic body is made of a torsion spring which includes a fixed end constrained by the sliding plate, a free end adapted to be guided along the lateral surface of the second guide means, and a center portion positioned between the fixed and free ends and fixed to the sliding plate to provide a predetermined trajectory according to the sliding movement.

4. The sliding swing apparatus as claimed in claim 3, wherein the rolling member is provided on the free end and is adapted to roll forced against the lateral surface of the second guide means.

5. The sliding swing apparatus as claimed in claim 2, wherein the rolling member is made of metallic material.

6. The sliding swing apparatus as claimed in claim 1, wherein the first guide means comprises a pair of guide grooves recessed from the base the length of the distance between the initial and final positions, a pair of guide rods having both ends fixed in such a manner to traverse the pair of guide grooves, and a pair of fastening portions made by bending both ends of the sliding plate in such a manner to surround a predetermined length of the guide rod and adapted to slide along the pair of guide rods.

7. The sliding swing apparatus as claimed in claim 1, wherein the second guide means includes a pair of first guide rails formed on both lateral surfaces thereof, respectively, and a second guide rail formed on the upper surface thereof and positioned between the pair of first guide rails.

8. The sliding swing apparatus as claimed in claim 7, wherein the first guide rail comprises a first stop groove for determining the initial position, a second stop groove for determining the final position, a first slant surface gradually extending away from the first stop groove perpendicular to the sliding direction, and a second slant surface gradually approaching the second stop groove from the first slant surface perpendicular to the sliding direction.

9. The sliding swing apparatus as claimed in claim 8, wherein a rolling groove of a predetermined depth is continuously formed between the first and second stop grooves.

10. The sliding swing apparatus as claimed in claim 7, wherein the second guide rail comprises a first guide groove recessed a predetermined depth so that the swing shaft can slide therein and a second guide groove recessed a predetermined depth from the first guide groove to limit the swing motion of the swing plate during sliding of the sliding plate, both ends of the first guide groove having a semi-cylindrical shape, and the second guide groove being linear.

11. The sliding swing apparatus as claimed in claim 1, further comprising a limitation means for limiting the amount of rotation of the swing plate after the sliding movement has been completed.

12. The sliding swing apparatus as claimed in claim 11, wherein the limitation means comprises a swing groove formed on an end of the second guide means with a predetermined depth and a stopper extending downward from the lower end of the swing shaft and adapted to swing in the swing groove.

13. The sliding swing apparatus as claimed in claim 11, wherein the amount of rotation is between 0° and 90°.

14. The sliding swing apparatus as claimed in claim 1, wherein the sliding plate is integrally mounted to the swing shaft by laser welding.

15. The sliding swing apparatus as claimed in claim 1, wherein the base has a circular opening through which a flexible circuit passes.

16. The sliding swing apparatus as claimed in claim 1, wherein the base, the first guide means, the second guide means, the swing shaft, the sliding plate, and the swing plate are made of metallic material.

17. The sliding swing apparatus as claimed in claim 1, wherein the swing plate has a number of tension protrusions for providing tension between the swing plate and the sliding plate, and the tension protrusions have a shape bent towards the sliding plate.

18. A sliding swing apparatus of a portable communication apparatus having a body and a sliding housing adapted to be exposed/covered through sliding and swing motions while facing the body, the sliding swing apparatus comprising:
   a guide means mounted on a base;
   a swing shaft adapted to slide while being contained in the guide means;
   a sliding plate adapted to slide along the longitudinal direction of the base by the guide means;
   a force supply means positioned between the sliding plate and the guide means and adapted to provide a stopping force in an initial and a final position, and to provide an opening and closing force between the initial and final positions; and
   a rotatable swing plate connected to the swing shaft, the rotational motion of the swing plate being limited by the guide means during the sliding movement, and the swing plate being adapted to swing only after the sliding movement is completely performed.

19. The sliding swing apparatus as claimed in claim 18, wherein the force supply means comprises an elastic body and a roller connected to a free end of the elastic body and adapted to roll on the guide means during the sliding movement.

20. The sliding swing apparatus as claimed in claim 19, wherein the elastic body is a torsion spring which includes a fixed end constrained by the sliding plate, a free end adapted to be guided along a lateral surface of the guide means, and a center portion positioned between the fixed and free ends and fixed to the sliding plate to provide a predetermined trajectory according to the sliding movement.

21. The sliding swing apparatus as claimed in claim 18, wherein the swing shaft has a stopper that rotates a predetermined arcuate distance with the swing plate.

22. A sliding swing apparatus of a portable communication apparatus having a body and a sliding housing adapted to be exposed/covered through sliding and swing motions while facing the body, the sliding swing apparatus comprising:

a sliding plate adapted to slide along a guide constrained by a base;

a force supply means positioned between the sliding plate and the guide and adapted to provide a stopping force in first and second positions and an opening and closing force between the first and second positions, the force supply means including a torsion spring, the torsion spring having a fixed end constrained by the sliding plate, a free end connected to a roller rolling along a lateral surface of the guide during sliding movement of the sliding plate, and a center portion positioned between the fixed and free ends and fixed to the sliding plate to provide a predetermined trajectory according to the sliding movement; and a rotatable swing plate adapted to accompany the sliding plate as one unit during linear sliding of the sliding plate by means of the guide, the rotational motion of the swing plate being limited during sliding, and the swing plate being rotatable only after the sliding movement ends.

* * * * *